(12) United States Patent
Blaikie

(10) Patent No.: US 7,957,577 B2
(45) Date of Patent: Jun. 7, 2011

(54) BANK DOCUMENT IMAGE VIEWING APPARATUS AND METHODS OF A FINANCIAL INSTITUTION PRESENTING AN IMAGE OF A BANK DOCUMENT IN A CHECK TRUNCATION ENVIRONMENT

(75) Inventor: Andrew R. Blaikie, Waterloo (CA)

(73) Assignee: NCR Corporation, Duluth, GA (US)

(*) Notice: Subject to any disclaimer, the term of this patent is extended or adjusted under 35 U.S.C. 154(b) by 968 days.

(21) Appl. No.: 11/827,868

(22) Filed: Jul. 13, 2007

(65) Prior Publication Data
US 2009/0016594 A1   Jan. 15, 2009

(51) Int. Cl.
*G06K 9/00* (2006.01)
(52) U.S. Cl. .......................... 382/137; 705/50
(58) Field of Classification Search .................. 382/100, 382/115, 116, 117, 118, 119, 135, 137, 138, 382/139, 140
See application file for complete search history.

(56) References Cited

U.S. PATENT DOCUMENTS

| 7,546,334 | B2* | 6/2009 | Redlich et al. | 709/201 |
| 7,748,027 | B2* | 6/2010 | Patrick | 726/2 |
| 2006/0259983 | A1* | 11/2006 | Sperry | 726/28 |
| 2007/0056034 | A1* | 3/2007 | Fernstrom | 726/20 |
| 2008/0168135 | A1* | 7/2008 | Redlich et al. | 709/204 |
| 2008/0222040 | A1* | 9/2008 | Halsted et al. | 705/51 |

* cited by examiner

*Primary Examiner* — Anand Bhatnagar
(74) *Attorney, Agent, or Firm* — Michael Chan; Paul W. Martin

(57) ABSTRACT

A method is provided of a financial institution presenting an image of a bank document in a check truncation environment. The method comprises determining security permission level associated with a person to be presented with the image of the bank document, determining type of the bank document, locating a first sensitive area associated with the bank document, and presenting on a screen of a monitor the image of the bank document with the first sensitive area in the image being selectively blanked out based upon the security permission level associated with the person to be presented with the image of the bank document.

18 Claims, 10 Drawing Sheets

BANK DOCUMENT IMAGE VIEWING APPARATUS AND METHODS OF A FINANCIAL INSTITUTION PRESENTING AN IMAGE OF A BANK DOCUMENT IN A CHECK TRUNCATION ENVIRONMENT

BACKGROUND

The present invention relates to viewing images of bank documents, and is particularly directed to a bank document image viewing apparatus and methods of presenting an image of a bank document in a check truncation environment.

In a check truncation environment, an original check is not transferred between banks during the check clearing process. Instead, the original check is scanned to provide electronic image data which is representative of an image of the original check. The image data which is representative of the image of the original check is transferred from one bank to another bank. The image data which is representative of the image of the original check may be stored in a check image archive.

When a paper version of the original check is needed, it may be printed on demand using the image data which is representative of the original check. This paper version is called an image replacement document (IRD). Subsequently, the IRD may be scanned to provide electronic image data which is representative of an image of the IRD. The image data which is representative of the image of the IRD may be stored in an IRD image archive.

Also, in a check truncation environment, banks are offering new document image retrieval services for bank customers and bank employees. Depending upon content of a retrieved document image and who is viewing the retrieved document image, certain sensitive areas of information appearing on the document image need to be blanked out so that this information cannot be viewed. It would be desirable to provide a system and method in a check truncation environment in which sensitive areas of information appearing on document images, such as check images or images of IRDs, can be selectively blanked out.

SUMMARY

In accordance with one embodiment of the present invention, a method of a financial institution presenting an image of a bank document in a check truncation environment comprises determining security permission level associated with a person to be presented with the image of the bank document, determining type of the bank document, locating a first sensitive area associated with the bank document, and presenting on a screen of a monitor the image of the bank document with the first sensitive area in the image being selectively blanked out based upon the security permission level associated with the person to be presented with the image of the bank document.

DETAILED DESCRIPTION

Figure 1:
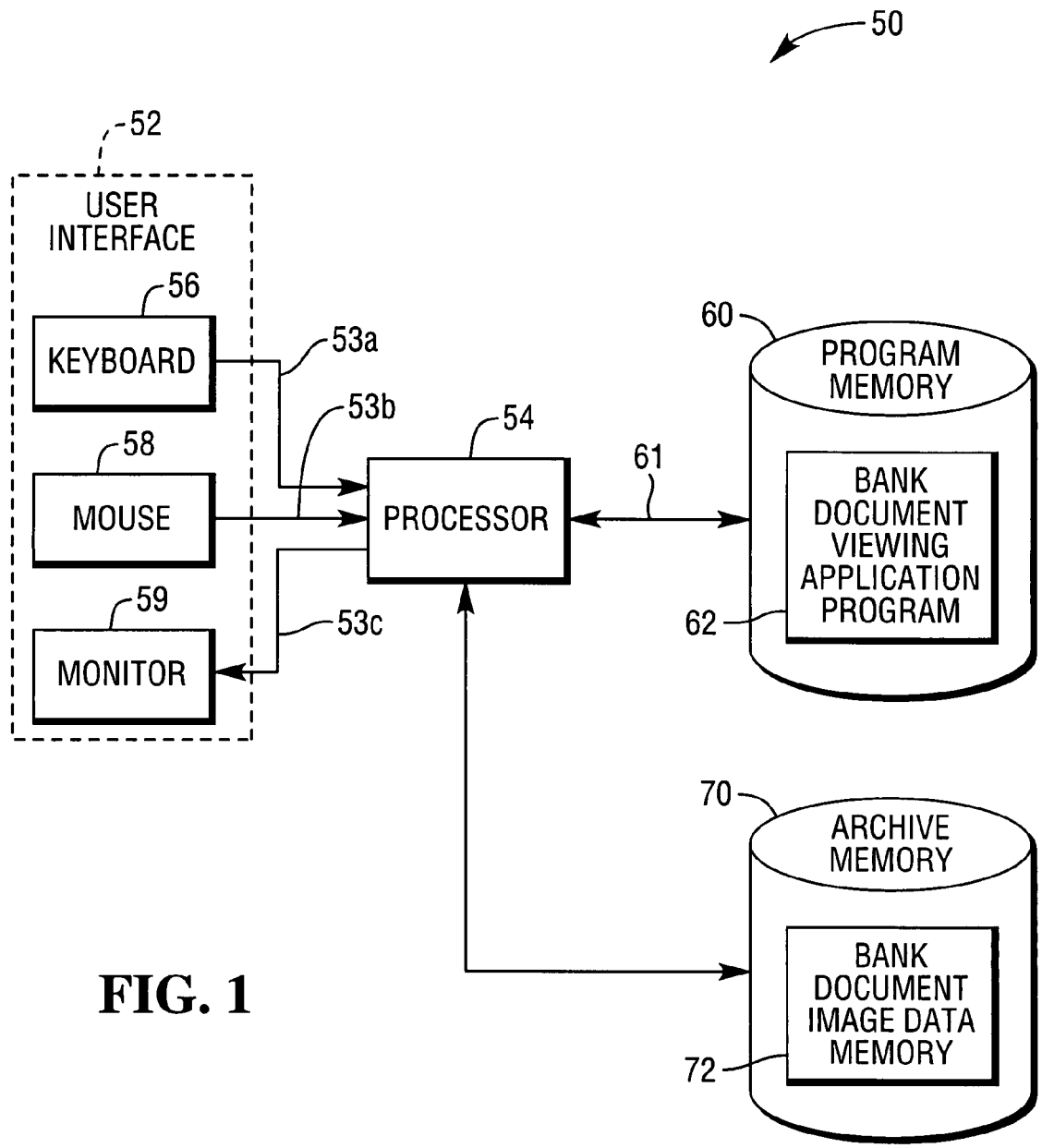
FIG. 1 is a schematic block representation of a bank document image viewing apparatus in accordance with an embodiment of the present invention.

The present invention is directed to a bank document image viewing apparatus and methods of presenting an image of a bank document in a check truncation environment. The specific bank document used in the check truncation environment may vary. Referring to FIG. 1, a schematic block representation of a bank document image viewing apparatus 50 in accordance with an embodiment of the present invention is illustrated. The bank document viewing apparatus 50 includes a user interface 52 which communicates via signals on lines 53a, 53b, 53c with a processor 54. The user interface 52 includes a keyboard 56, a mouse 58, and a monitor 59, all of which communicate via signals on lines 53a, 53b, 53c with the processor 54.

The bank document image viewing apparatus 50 also includes a program memory 60 which communicates via signals on line 61 with the processor 54. It is conceivable that the program memory 60 could be a single memory unit or a plurality of different memory units. Suitable processors and memories are readily available in the marketplace. Their structure and operation are well known and, therefore, will not be described.

An executable bank document image viewing application program 62 is stored in the program memory 60. When the bank document image viewing application program 62 is executed, display screens such as will be described hereinbelow are displayed on the screen of the monitor 59 in accordance with the bank document viewing application program. An archive memory 70 includes a bank document image data memory 72 which stores document images which have been captured from physical bank documents.

Figure 2:
FIG. 2 is the front side of an original check.

Different types of bank documents are processed in a check truncation environment. One type of bank document processed in a check truncation environment is in the form of a personal check 10, as shown in FIG. 2. The check features shown in FIG. 2 include a payer field 12, a date field 14, a check number field 16 located in the upper-right corner of the check 10, a payee field 18, a courtesy amount field 20, a legal amount field 22, a paying bank name field 24, a memo field 26, a payer signature field 28, and a magnetic ink character recognition (MICR) codeline field 29.

Figure 3:
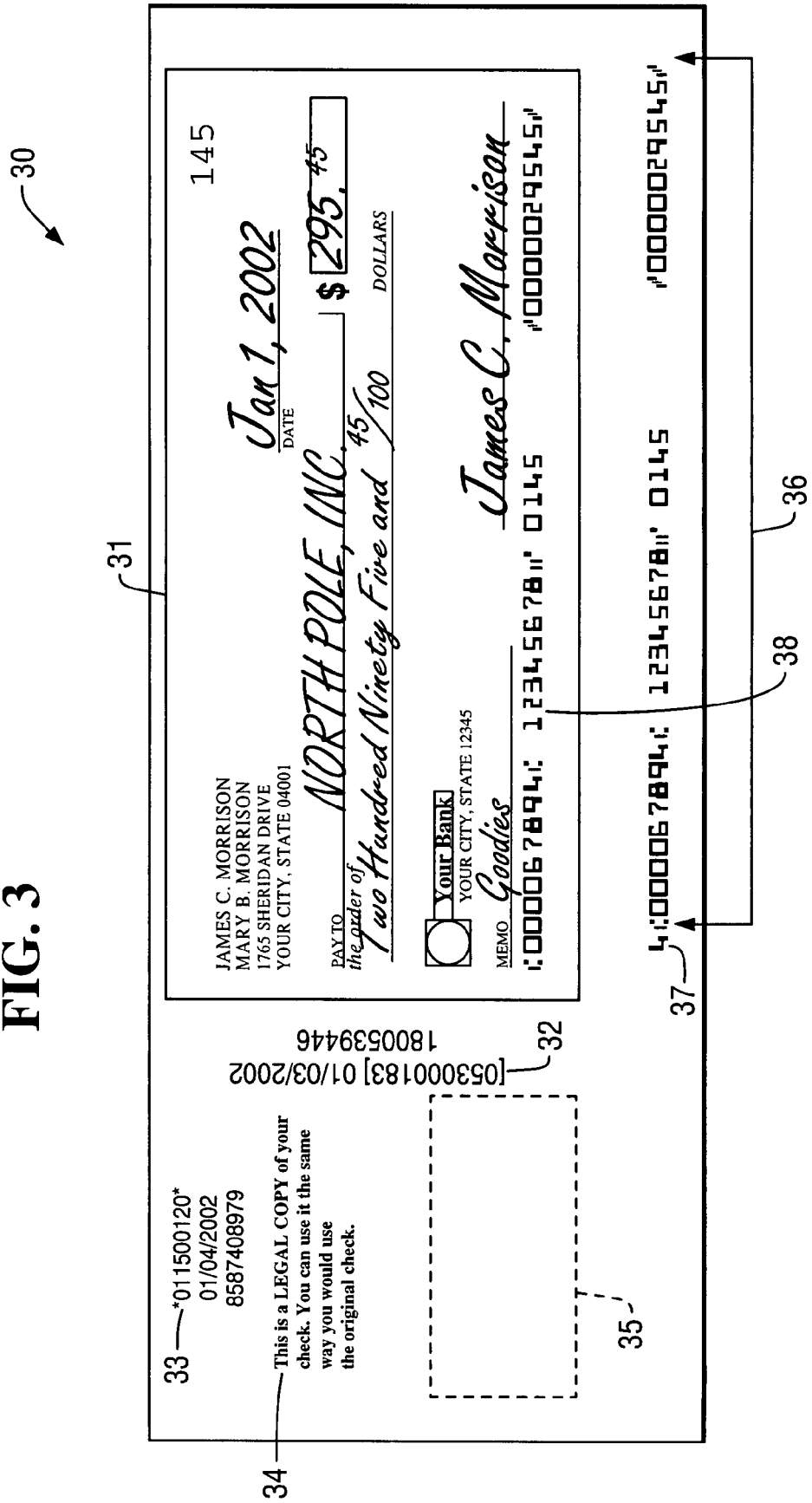
FIG. 3 is the front side of an image replacement document (IRD) for the original check of FIG. 2.

Another type of bank document processed in a check truncation environment is in the form of an original image replacement document (IRD) 30, as shown in FIG. 3. In a check truncation environment, an IRD is sometimes referred to as a substitute check. The American National Standards Institute (ANSI) X9.90 standard defines the content of IRDs in a check truncation environment.

Figure 4:
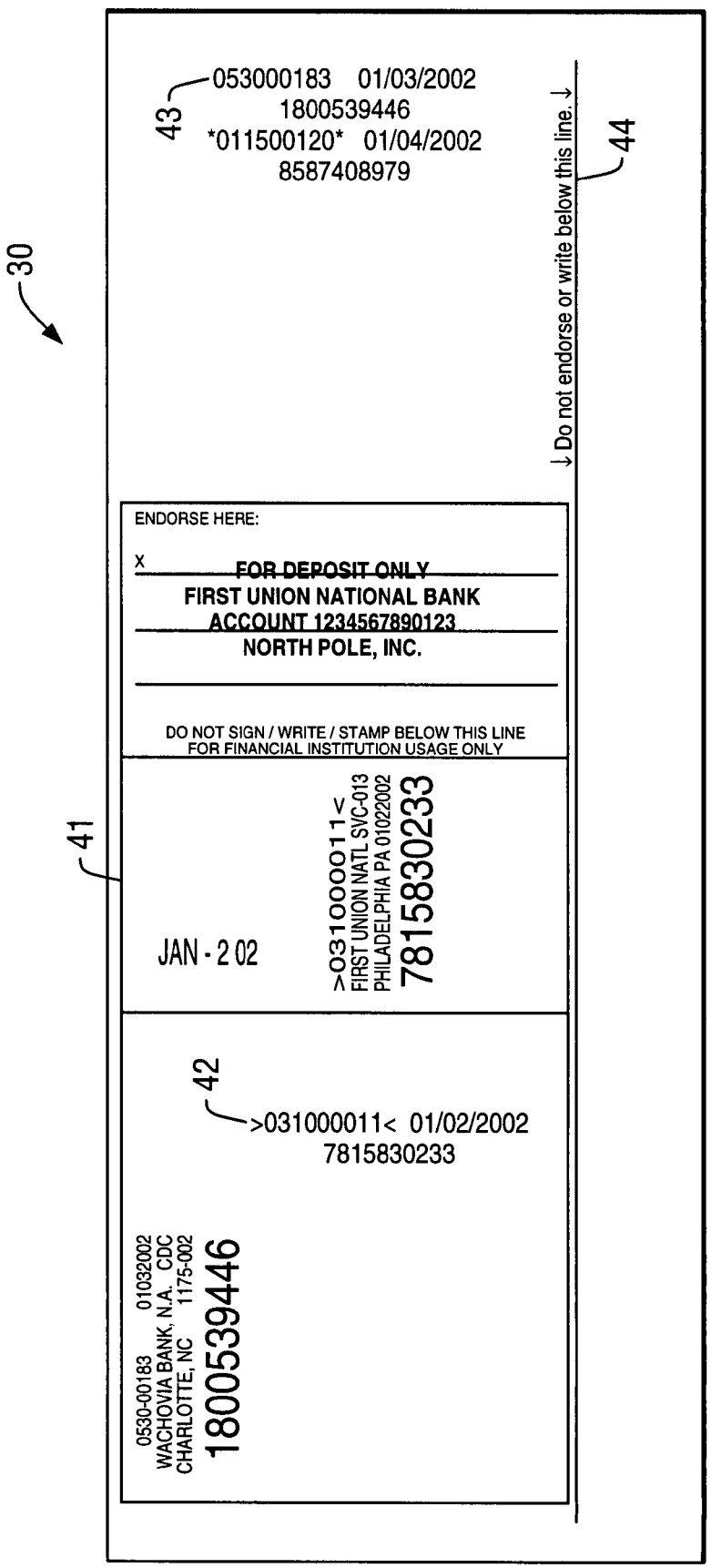
FIG. 4 is the back side of the IRD of FIG. 3.

Referring to FIGS. 3 and 4, the front side (FIG. 3) of the original IRD 30 of the check 10 and the backside (FIG. 4) of the original IRD are illustrated. The front side of the original IRD 30 includes a scanned front image 31 of the check 10. The front side of the original IRD 30 also includes an endorsement 32 of the bank which captured the image of the check 10 to provide the front image 31. The bank which captured the front image 31 of the check 10 may or may not be the bank of first deposit.

The front side of the original IRD 30 further includes an endorsement 33 of the bank which created the original IRD. This endorsement 33 includes three elements which are (i) the routing transit number "011500120" associated with the original IRD 30, (ii) the date of creation of the original IRD (i.e., "Jan. 4, 2002"), and (iii) the sequence number "8587408979" associated with the original IRD. The two asterisks enclosing the routing transit number are used to indicate that this is the bank which created the original IRD 30, as defined by the ANSI X9.90 standard. The front side of the original IRD 30 also includes a text overlay 34 which identifies the original IRD as being a legal copy of the check 10. Also included is an optional information area 35, as defined by the ANSI X9.90 standard, for placing optional information.

The front side of the original IRD 30 also includes a MICR codeline 36 from the check 10 which has been encoded. This MICR codeline 36 is printed with ink which contains magnetic properties (referred to herein as "magnetic ink") and is the same as the MICR codeline image 38 contained in the front image 31 of the check 10. Also included is an IRD identification 37 adjacent to the MICR codeline 36, in the position as shown in FIG. 2. The IRD identification 37 is referred to as an "electronic processing code (EPC) digit" as defined by the ANSI X9.90 standard. The IRD identification 37 is also printed with magnetic ink.

As shown in FIG. 4, the back side of the original IRD 30 includes a scanned back image 41 of the check 10. The back side of the original IRD 30 also includes an initial bank of first deposit (BOFD) endorsement overlay 42. An overlay 43 of any subsequent endorsements, and a line/text overlay 44 which requests that no writings be made below the line are also included.

Figure 5:
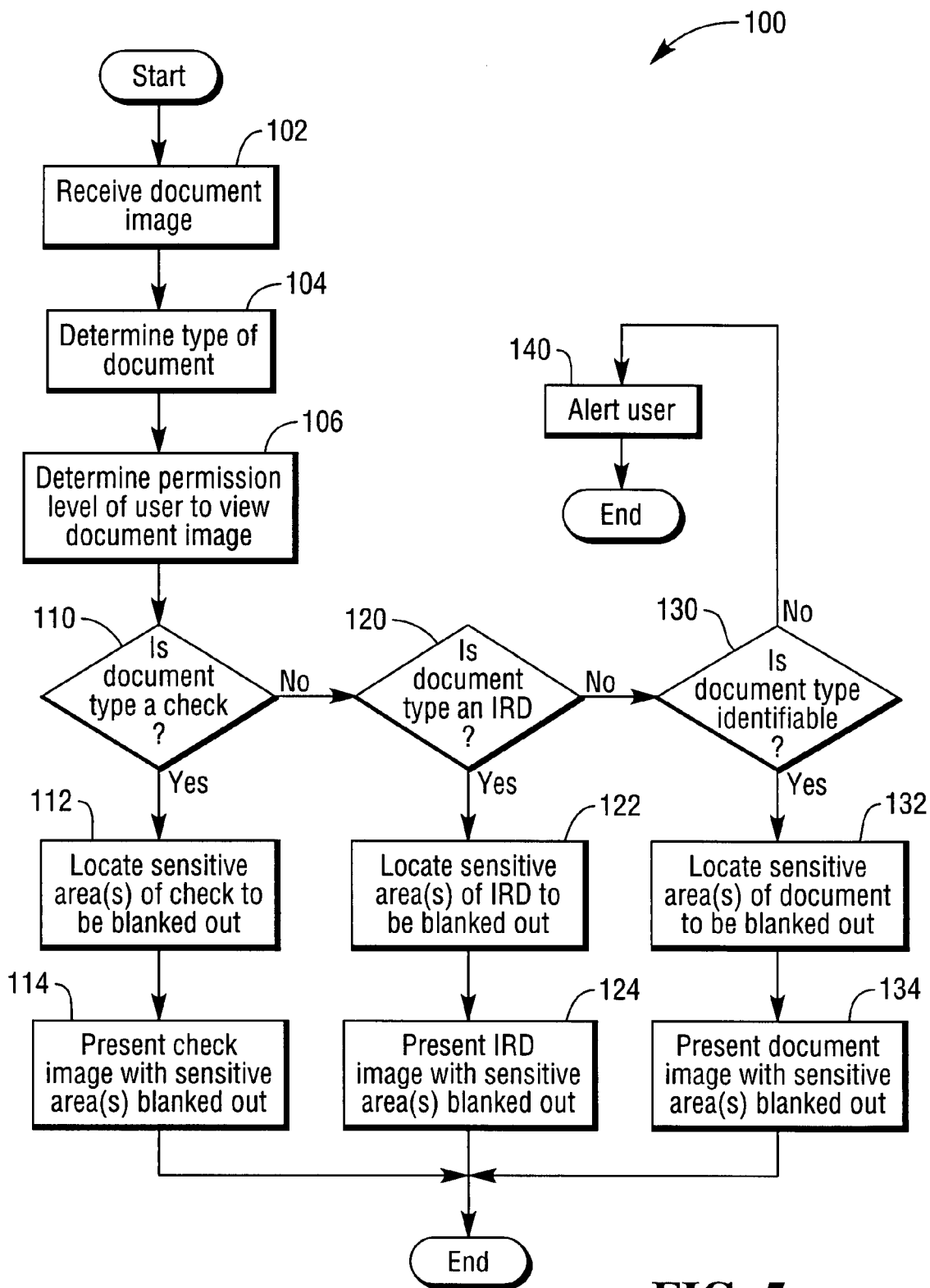
FIG. 5 is a flowchart depicting a method in accordance with an embodiment of the present invention.

Referring to FIG. 5, a flowchart 100 depicts a method in accordance with an embodiment of the present invention. After a document image is received (step 102), the type of the document is determined (step 104). The type of the document may be determined based upon content contained in the document image. Then, in step 106, a permission level of a user to view the document image is determined based upon the document type which was determined in step 104.

A determination is then made in step 110 as to whether the document is a check. If the determination made in step 110 is affirmative (i.e., the document is a check), the program proceeds to step 112. In step 112, any sensitive area of the check image to be blanked out is located. The sensitive areas of the check image to be blanked out are based upon the permission level of the user to view the check image as was determined back in step 106. Recognition techniques for locating specific areas of a check image are known and, therefore, will not be described. After sensitive areas of the check image are located, the check image is presented to the user with these sensitive areas blanked out (step 114).

Figure 6:
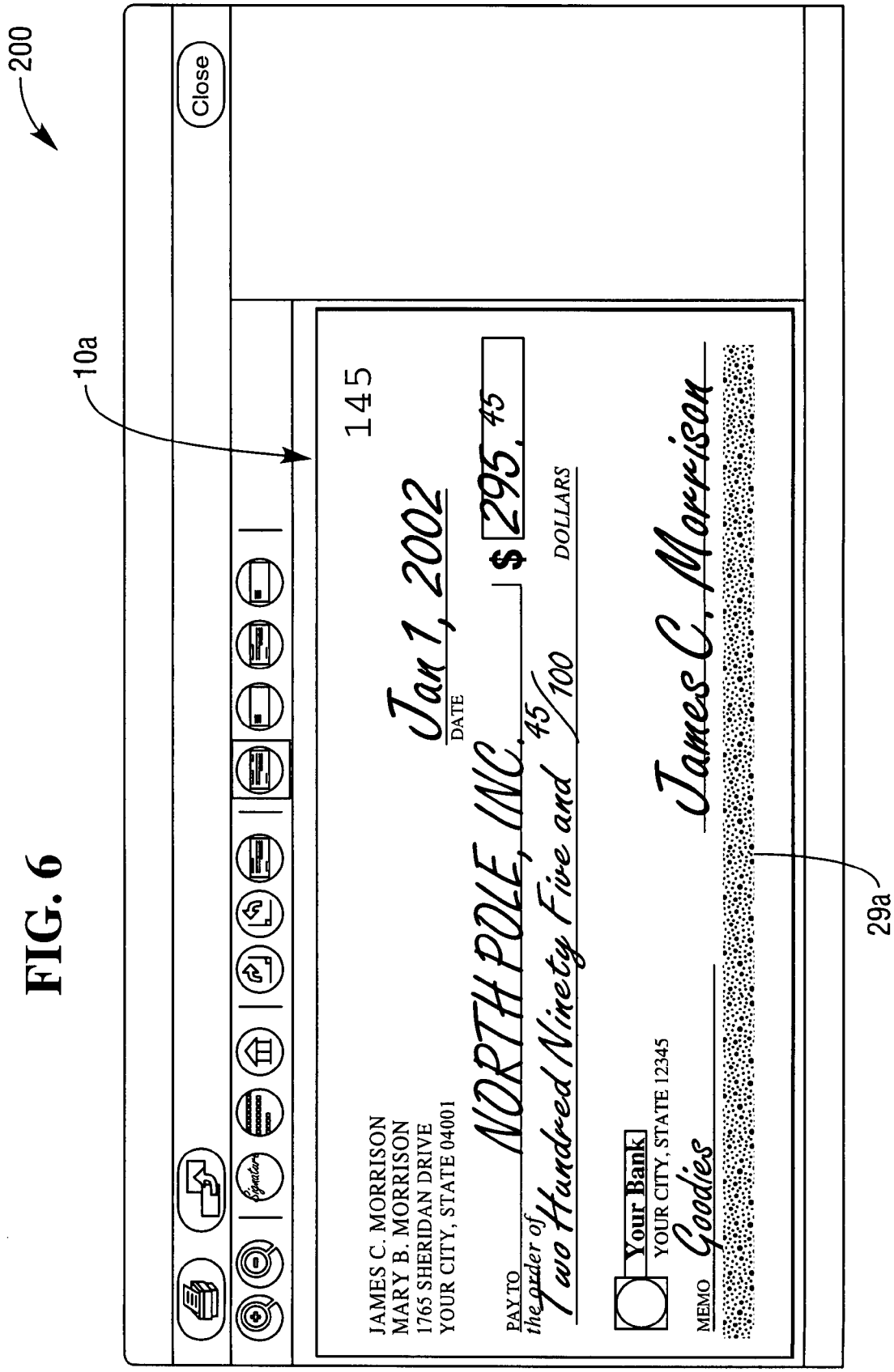
FIG. 6 is a display screen of an image of the check of FIG. 2 with a select sensitive area of the check image blanked out.
Figure 7:
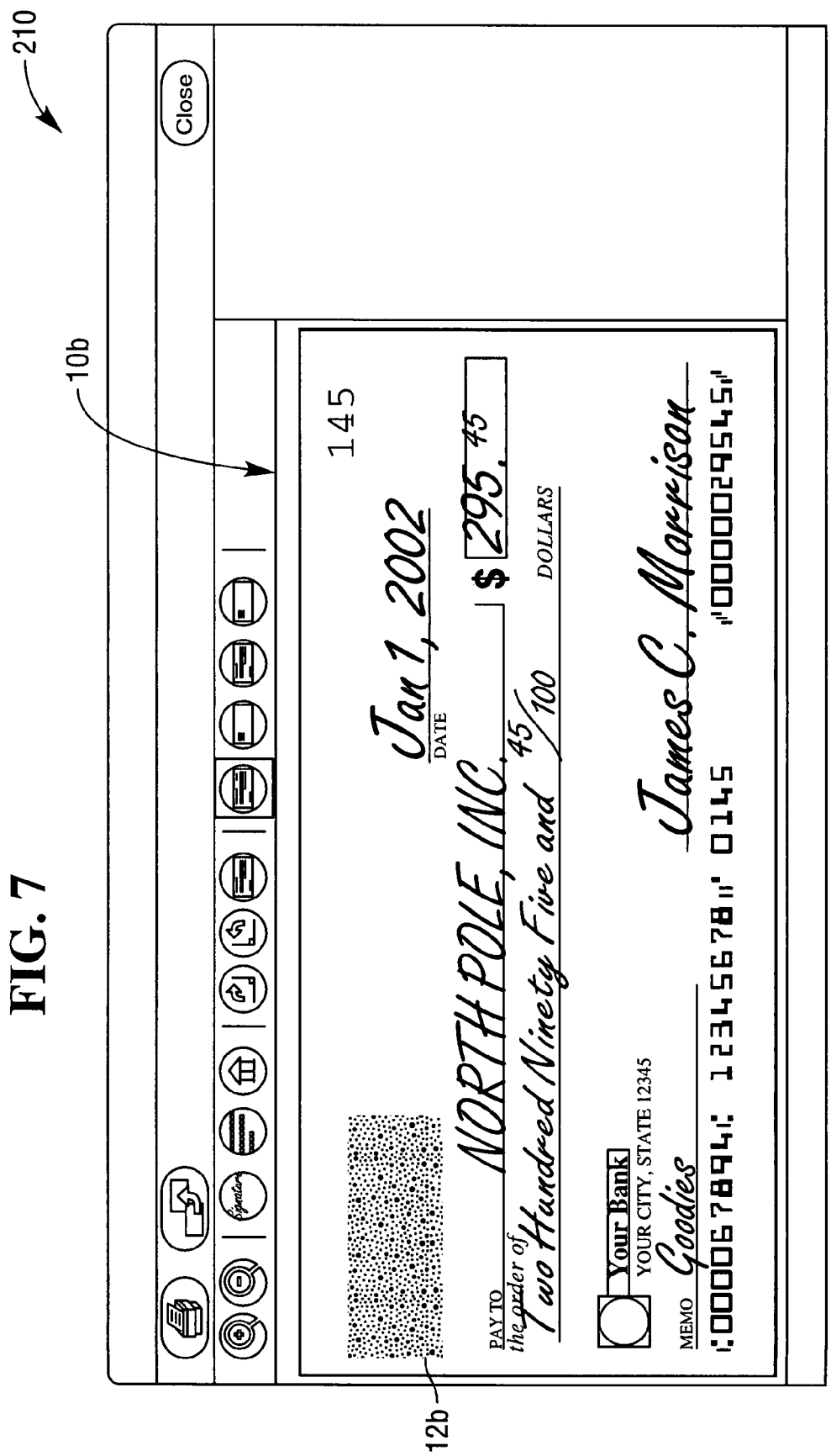
FIG. 7 is a display screen similar to FIG. 6 with a different select sensitive area of the check image blanked out.
Figure 8:
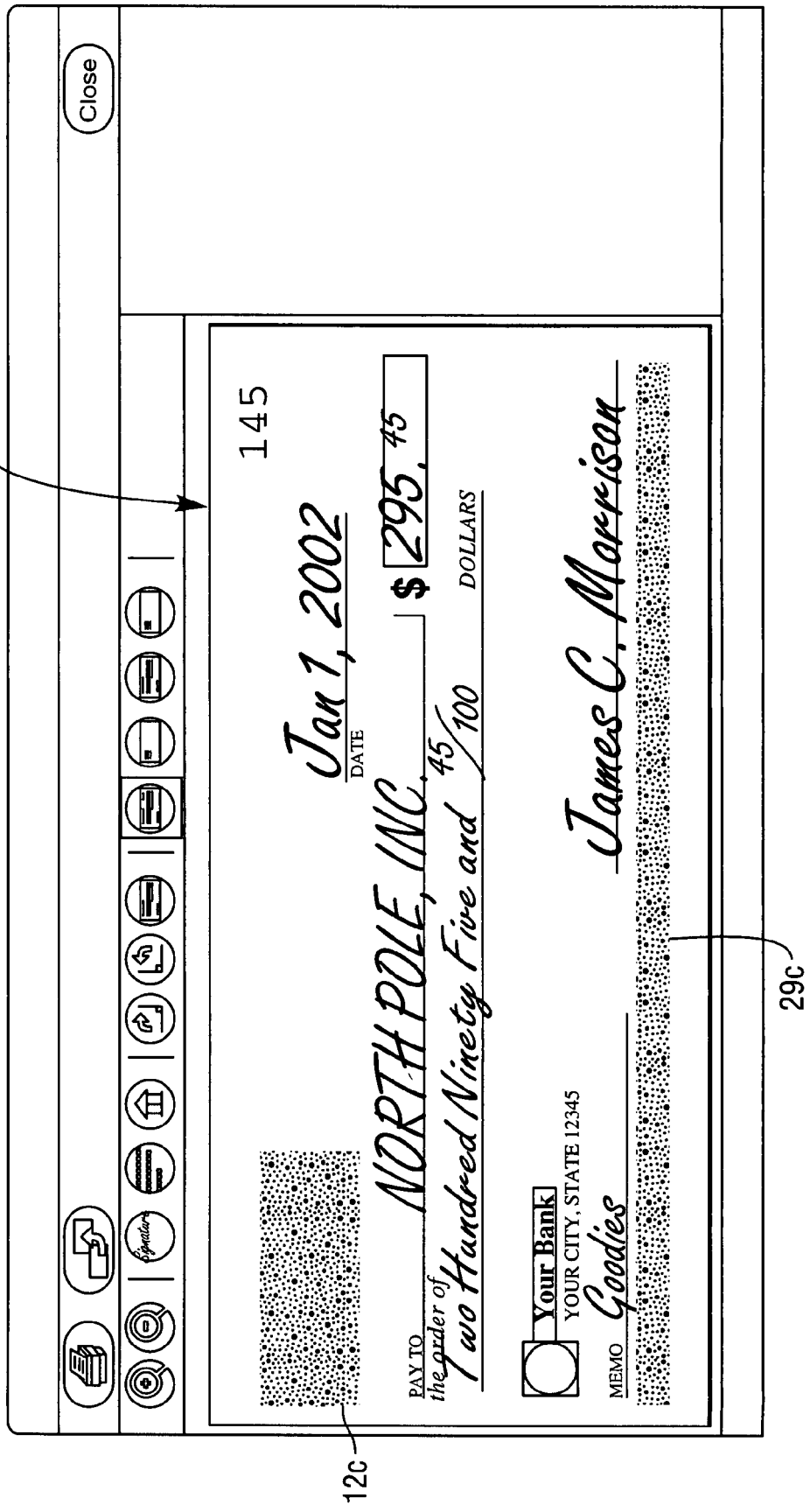
FIG. 8 is a display screen similar to FIG. 6 with a plurality of sensitive areas of the check image blanked out.

As an example, the check 10 of FIG. 2 is displayed on a display screen 200 in FIG. 6 as a check image 10a with a blanked out MICR codeline 29a. As another example, the check 10 of FIG. 2 is displayed on a display screen 210 in FIG. 7 as a check image 10b with a blanked out payer field 12b. Still as another example, the check 10 of FIG. 2 is displayed on a display screen 220 in FIG. 8 as a check image 10c with both a blanked out MICR codeline 29c and a blanked out payer field 12c.

However, if the determination back in step 110 was negative (i.e., the document is not a check), the program proceeds to step 120. In step 120, a determination is made as to whether the document is an IRD. If the determination made in step 120 is affirmative (i.e., the document is an IRD), any sensitive area of the IRD image to be blanked out is located. The sensitive areas of the IRD image to be blanked out are based upon the permission level of the user to view the IRD image as was determined back in step 106. Recognition techniques for locating specific areas of an IRD image are known and, therefore, will not be described. After sensitive areas of the IRD image are located, the IRD image is presented to the user with these sensitive areas blanked out (124).

Figure 9:
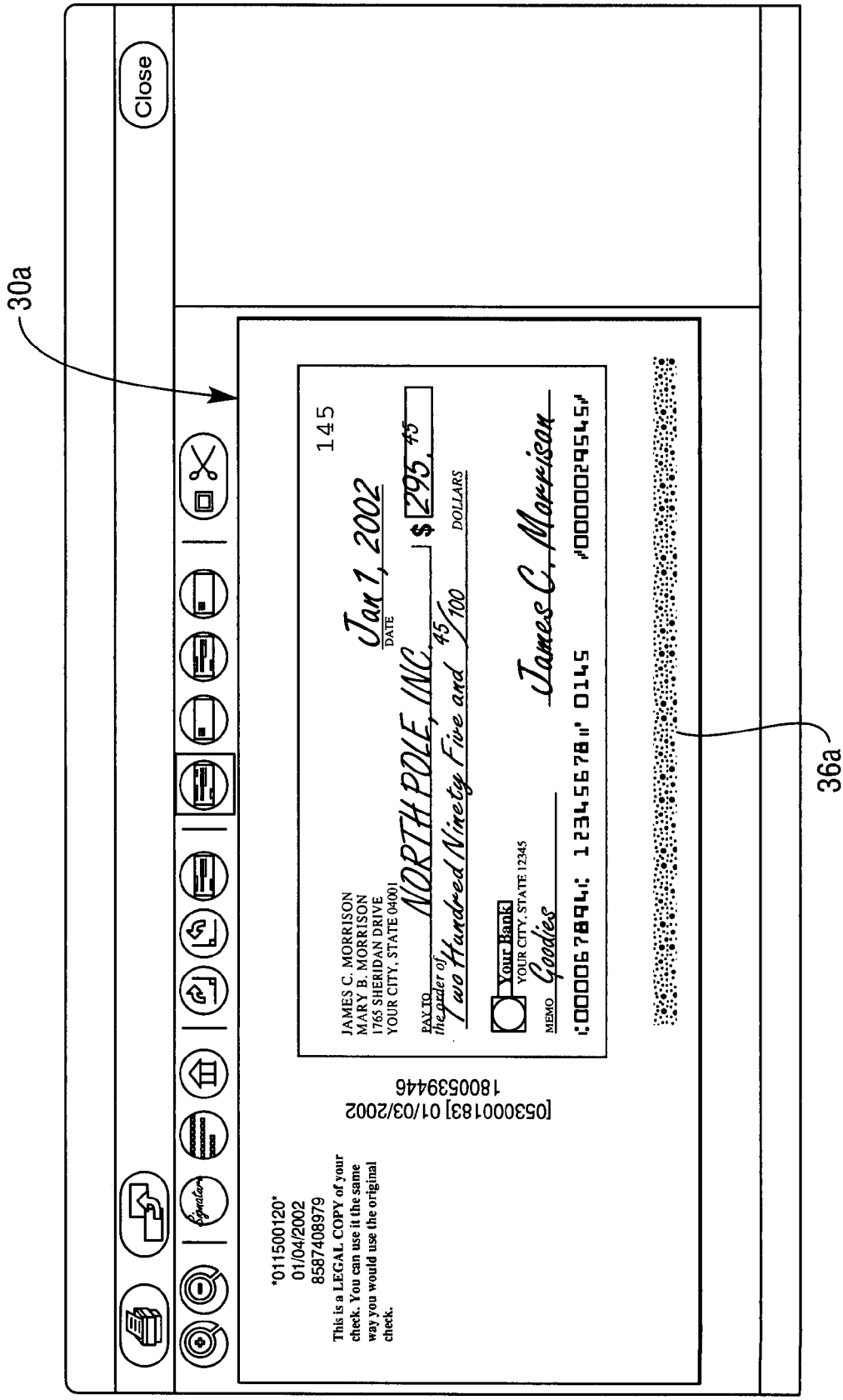
FIG. 9 is a display screen of an image of the front side of the IRD of FIG. 3 with a select sensitive area of the IRD image blanked out.
Figure 10:
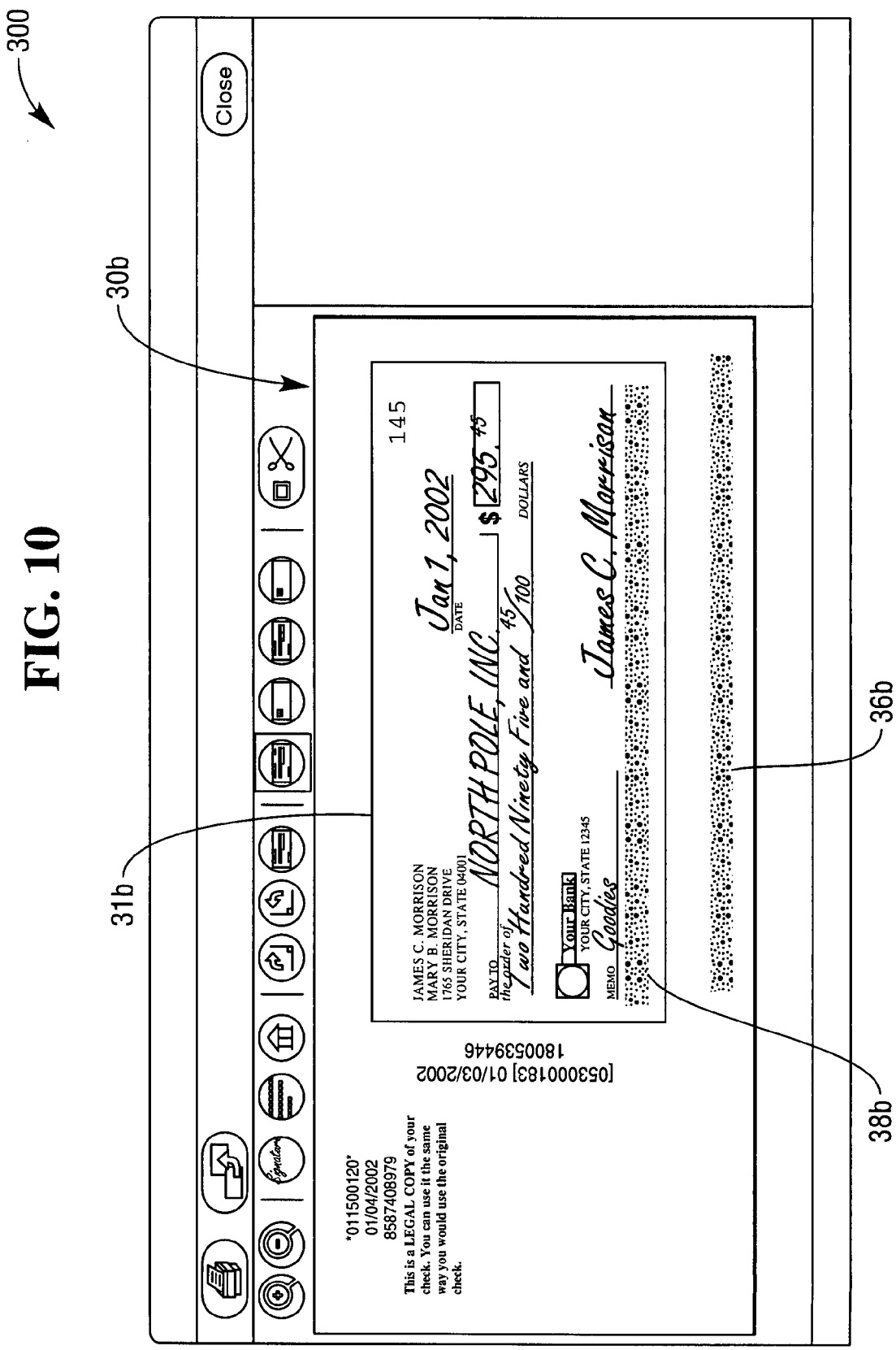
FIG. 10 is a display screen similar to FIG. 9 with an additional select sensitive area of the IRD image blanked out.

As an example, the IRD 30 of FIG. 3 is displayed on a display screen 300 in FIG. 9 as an IRD image 30a with a blanked out MICR codeline 36a. As another example, the IRD 30 of FIG. 3 is displayed on a display screen 310 in FIG. 10 as an IRD image 30b with both a blanked out MICR codeline 36b and a blanked out MICR codeline image 38b in the front image 31b of the IRD 30.

However, if the determination back in step 120 was negative (i.e., the document is not an IRD), the program proceeds to step 130. In step 130, a determination is made as to whether the type of the document is identifiable. If the determination made in step 130 is affirmative (i.e., the document type is identifiable), the program proceeds to step 132. In step 132, any sensitive area of the document image to be blanked out is located. The sensitive areas of the document image to be blanked out are based upon the identified document type and the permission level of the user to view the document image as was determined back in step 106. Recognition techniques for locating specific areas of a document image are known and, therefore, will not be described. After sensitive areas of the document image are located, the document image is presented to the user with these sensitive areas blanked out (step 134).

However, if the determination back in step 130 was negative (i.e., the document type is not identifiable), the program proceeds to step 140. In step 140, an operator at the financial institution is alerted that the type of the document is not identifiable. The operator at the financial institution can then appropriate action as needed. For example, the operator may decide that the corresponding document image with no areas blanked out should be presented to the user independent of the permission level of the user as was determined back in step 106. As another example, the operator may decide that the corresponding document image should not be presented to the user at all.

It should be apparent that check images or IRD images can be better viewed by different user groups having different viewing needs of check images or IRD images. The bank document image viewing apparatus 50 and the bank document image viewing application program 62 support different user groups in viewing bank document images, such as check images or IRD images.

Although the above description describes two specific types of financial documents (i.e., checks and IRDs), it is conceivable that other specific types of financial documents could have been described. For examples, other specific types of documents could have included cash-in slips, cash-out slips, deposit slips, or adjustment slips. Any combination of specific types of financial documents is possible.

Further, although the above description describes two specific areas on a check image (i.e., the MICR codeline field and the payer field) as being sensitive, it is conceivable that other areas of the check image could have been described as being sensitive. Any combination of specific areas of the check image is possible.

Also, although the above description describes two specific areas on an IRD image (i.e., the MICR codeline field and the MICR codeline image) as being sensitive, it is conceivable that other areas of the IRD image could have been described as being sensitive. Any combination of specific areas of the IRD image is possible.

Also, although the above description describes one embodiment of a bank document image viewing apparatus and methods of a financial institution presenting an image of a bank document in a check truncation environment, it is conceivable that other apparatus and methods of a financial institution presenting an image of a bank document in a check truncation environment in the spirit of the present invention are possible.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of a financial institution presenting an image of a bank document in a check truncation environment, the method comprising:
    receiving the image of the bank document from an image storage location;
    determining security permission level associated with a person to be presented with the image of the bank document;
    determining type of the bank document;
    locating a first sensitive area associated with the bank document; and
    presenting on a screen of a monitor the image of the bank document with first information in the first sensitive area in the image being selectively hidden based upon the security permission level associated with the person to be presented with the image of the bank document.

2. A method according to claim 1, wherein (i) the bank document comprises a check, and (ii) the first sensitive area associated with the check comprises a magnetic ink character recognition (MICR) codeline.

3. A method according to claim 1, wherein (i) the bank document comprises a check, and (ii) the first sensitive area associated with the check comprises account holder information associated with the check.

4. A method according to claim 1, further comprising:
    locating a second sensitive area associated with the bank document; and
    presenting on the screen of the monitor the image of the bank document with second information in the second sensitive area in the image being selectively hidden based upon the security permission level associated with the person to be presented with the image of the bank document.

5. A method according to claim 4, wherein (i) the bank document comprises a check, (ii) the first sensitive area associated with the check comprises a magnetic ink character recognition (MICR) codeline, and (iii) the second sensitive area associated with the check comprises account holder information associated with the check.

6. A method according to claim 4, wherein (i) the bank document comprises an image replacement document (IRD) of an original check, (ii) the first sensitive area associated with the IRD comprises a first magnetic ink character recognition (MICR) codeline associated with the IRD, and (iii) the second sensitive area associated with the IRD comprises a second MICR codeline in an image of the original check on the IRD.

7. A method of a financial institution presenting an image of a check in a check truncation environment, the method comprising:
    receiving the image of the check from an image storage location;
    determining security permission level associated with a person to be presented with the check image;
    locating a first sensitive area associated with the check;
    locating a second sensitive area associated with the check, the second sensitive area being different from the first sensitive area; and
    presenting on a screen of a monitor the check image with first information in the first sensitive area in the check image and second information in the second sensitive area in the check image being selectively hidden based upon the security permission level associated with the person to be presented with the check image.

8. A method according to claim 7, wherein (i) the first sensitive area associated with the check comprises a magnetic ink character recognition (MICR) codeline, and (iii) the second sensitive area associated with the check comprises account holder information associated with the check.

9. A bank document image viewing apparatus comprising:
    a monitor having a screen;
    an executable viewing application program; and
    a processor for executing the viewing application program to receive an image of a bank document from an image storage location and to present the image of the bank document on the screen of the monitor such that first information in a first sensitive area of the bank document is selectively hidden based upon type of the bank document and security permission level of a person to be presented with the image of the bank document.

10. A bank document image viewing apparatus according to claim 9, wherein (i) the bank document comprises a check, and (ii) the first sensitive area associated with the check comprises a magnetic ink character recognition (MICR) codeline.

11. A bank document image viewing apparatus according to claim 9, wherein (i) the bank document comprises a check, and (ii) the first sensitive area associated with the check comprises account holder information associated with the check.

12. A bank document image viewing apparatus according to claim 9, wherein the viewing application program is further executed by the processor such that second information in a second sensitive area of the bank document is selectively hidden based upon type of the bank document and security permission level of a person to be presented with the image of the bank document.

13. A bank document image viewing apparatus according to claim 12, wherein (i) the bank document comprises a check, (ii) the first sensitive area associated with the check comprises a magnetic ink character recognition (MICR) codeline, and (iii) the second sensitive area associated with the check comprises account holder information associated with the check.

14. A bank document image viewing apparatus according to claim 12, wherein (i) the bank document comprises an image replacement document (IRD) of an original check, (ii) the first sensitive area associated with the IRD comprises a first magnetic ink character recognition (MICR) codeline associated with the IRD, and (iii) the second sensitive area associated with the IRD comprises a second MICR codeline in an image of the original check on the IRD.

15. A method of a financial institution presenting an image of a bank document in a check truncation environment, the method comprising:

determining security permission level associated with a person to be presented with the image of the bank document;

determining type of the bank document;

locating a first sensitive area associated with the bank document;

presenting on a screen of a monitor the image of the bank document with the first sensitive area in the image being selectively blanked out based upon the security permission level associated with the person to be presented with the image of the bank document;

locating a second sensitive area associated with the bank document; and presenting on the screen of the monitor the image of the bank document with the second sensitive area in the image being selectively blanked out based upon the security permission level associated with the person to be presented with the image of the bank document;

wherein (i) the bank document comprises an image replacement document (IRD) of an original check, (ii) the first sensitive area associated with the IRD comprises a first magnetic ink character recognition (MICR) codeline associated with the IRD, and (iii) the second sensitive area associated with the IRD comprises a second MICR codeline in an image of the original check on the IRD.

16. A bank document image viewing apparatus comprising:

a monitor having a screen;

an executable viewing application program; and a processor for executing the viewing application program to present an image of the bank document on the screen of the monitor such that a first sensitive area and a second sensitive area of the bank document are selectively blanked out based upon type of the bank document and security permission level of a person to be presented with the image of the bank document;

wherein (i) the bank document comprises an image replacement document (IRD) of an original check, (ii) the first sensitive area associated with the IRD comprises a first magnetic ink character recognition (MICR) codeline associated with the IRD, and (iii) the second sensitive area associated with the IRD comprises a second MICR codeline in an image of the original check on the IRD.

17. A method of a financial institution presenting an image of a bank document in a check truncation environment, the method comprising:

receiving the image of the bank document from an image storage location;

determining security permission level associated with a person to be presented with the image of the bank document;

determining type of the bank document;

locating a first sensitive area associated with the bank document; and presenting on a screen of a monitor the image of the bank document with the first sensitive area in the image being selectively blanked out based upon the security permission level associated with the person to be presented with the image of the bank document.

18. A bank document image viewing apparatus comprising:

a monitor having a screen;

an executable viewing application program; and a processor for executing the viewing application program to receive an image of a bank document from an image storage location and to present the image of the bank document on the screen of the monitor such that a first sensitive area of the bank document is selectively blanked out based upon type of the bank document and security permission level of a person to be presented with the image of the bank document.

\* \* \* \* \*